US009670891B2

(12) United States Patent
Miyake et al.

(10) Patent No.: US 9,670,891 B2
(45) Date of Patent: Jun. 6, 2017

(54) POWER SUPPLY FOR VEHICLE

(71) Applicant: KABUSHIKI KAISHA TOYOTA JIDOSHOKKI, Kariya-shi, Aichi-ken (JP)

(72) Inventors: Keiji Miyake, Aichi-ken (JP); Katsuyoshi Fujita, Aichi-ken (JP); Kazuyoshi Takada, Aichi-ken (JP); Wataru Yokoyama, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/815,262

(22) Filed: Jul. 31, 2015

(65) Prior Publication Data

US 2016/0040642 A1 Feb. 11, 2016

(30) Foreign Application Priority Data

Aug. 5, 2014 (JP) ................................ 2014-159486

(51) Int. Cl.
*F02N 11/04* (2006.01)
*H02K 23/52* (2006.01)
*F02N 11/08* (2006.01)

(52) U.S. Cl.
CPC .......... *F02N 11/0866* (2013.01); *F02N 11/04* (2013.01); *F02N 11/0814* (2013.01)

(58) Field of Classification Search
CPC ... F02N 11/0866; F02N 11/04; F02N 11/0814
USPC ................................ 290/31, 32, 36 R, 38 R
See application file for complete search history.

(56) References Cited

U.S. PATENT DOCUMENTS

| | | | | |
|---|---|---|---|---|
| 5,119,010 | A | 6/1992 | Shirata et al. | |
| 5,146,095 | A * | 9/1992 | Tsuchiya | F02N 11/0866 290/38 R |
| 2012/0330538 | A1* | 12/2012 | Spjuth | F02N 11/0866 701/113 |

FOREIGN PATENT DOCUMENTS

| | | | |
|---|---|---|---|
| JP | 360330 | A | 3/1991 |
| JP | 5321797 | A | 12/1993 |
| JP | 10-184506 | A | 7/1998 |
| JP | 11-252711 | A | 9/1999 |
| JP | 200379008 | A | 3/2003 |
| JP | 201412998 | A | 1/2014 |
| JP | 201488068 | A | 5/2014 |

* cited by examiner

*Primary Examiner* — Tulsidas C Patel
*Assistant Examiner* — Thomas Quigley
(74) *Attorney, Agent, or Firm* — Sughrue Mion, PLLC

(57) ABSTRACT

There is provided a power supply for a vehicle, including a generator, a lead battery, an electric storage device that is connected in parallel to the lead battery and to the generator, a starter circuit that has a capacitor and a starter and is connected in parallel to the lead battery and to the generator, and at least two switches of a first switch connected in series to the lead battery, a second switch connected in series to the power supply, and a third switch connected in series to the starter circuit.

5 Claims, 4 Drawing Sheets

| Vehicle requirement | | Control content of each switch | | |
|---|---|---|---|---|
| | | First switch | Second switch | Third switch |
| 1 | Engine restart | Any position | Any position | OFF |
| 2 | Powering | OFF | ON | OFF |
| 3 | Regeneration (~14.4V) | ON | ON | ON |
| 4 | Regeneration (14.4V~16V) | OFF | ON | ON |
| 5 | Regeneration (16V~18V) | OFF | OFF | ON |

| Vehicle requirement | | Control content of each switch | |
|---|---|---|---|
| | | First switch | Second switch |
| 1 | Engine restart | OFF | Any position |
| 2 | Powering | OFF | ON |
| 3 | Regeneration (~14.4V) | ON | ON |
| 4 | Regeneration (14.4V~16V) | OFF | ON |

| Vehicle requirement | | Control content of each switch | |
|---|---|---|---|
| | | First switch | Second switch |
| 1 | Engine restart | Any position | OFF |
| 2 | Powering | OFF | ON |
| 3 | Regeneration (~14.4V) | ON | ON |
| 4 | Regeneration (14.4V~16V) | OFF | ON |

| Vehicle requirement | | Control content of each switch | | |
|---|---|---|---|---|
| | | First switch | Second switch | Third switch |
| 1 | Engine restart | Any position | Any position | OFF |
| 2 | Powering | OFF | ON | OFF |
| 3 | Regeneration (~14.4V) | ON | ON | ON |
| 4 | Regeneration (14.4V~16V) | OFF | ON | Any position |

POWER SUPPLY FOR VEHICLE

BACKGROUND OF THE INVENTION

The present invention relates to a power supply for a vehicle.

Japanese Patent Application Publication No. H10-184506 discloses a power supply for a vehicle having two storage batteries including a lead battery and an additional storage battery.

However, such a power supply having two storage batteries has a problem in that the power supply is difficult to operate according to the characteristics of the respective storage devices.

A power supply, for example for a vehicle, is required to perform such functions as power supply to an auxiliary device, power supply to a starter, powering operation for a motor generator, regenerative operation when voltage of a lead battery is higher than its upper limit voltage (e.g. 14.4V). The control of such operations depends on a load and the characteristics of the respective storage devices. Specifically, the load of a vehicle includes an auxiliary device, a starter, and an alternator and the power input and output requirements are varied with the respective loads operated according to the vehicle requirements. Furthermore, the ranges of the input and output requirements are different according to the characteristics of the respective storage batteries and therefore, it has been difficult for the power supply to provide optimum operation under varying conditions of a vehicle.

For example, a lead battery which is used to supply electric power to a starter has problems in the durability and failure of power supply to an auxiliary device.

Although there is available a single battery that can handle various loads such as an idling stop lead battery, such a battery is costly.

The present invention which has been made in light to the above problems is directed to providing a power supply for a vehicle having a plurality of storage devices including a lead battery that operates appropriately according to the characteristics of the respective storage devices.

SUMMARY OF THE INVENTION

In accordance with one aspect of the present invention, there is provided a power supply for a vehicle, including a generator, a lead battery, an electric storage device that is connected in parallel to the lead battery and to the generator, a starter circuit that has a capacitor and a starter and is connected in parallel to the lead battery and to the generator, and at least two switches of a first switch connected in series to the lead battery, a second switch connected in series to the power supply, and a third switch connected in series to the starter circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe embodiments according to the present invention with reference to the accompanying drawings.

First Embodiment

Figures 1, 2:
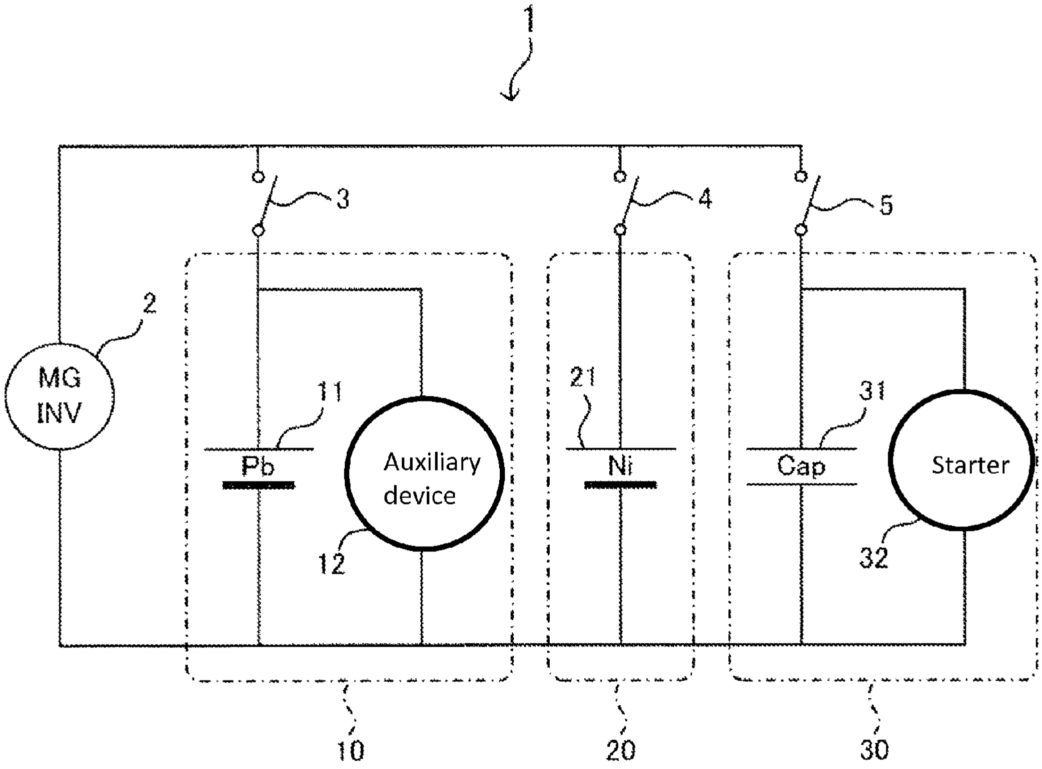
FIG. 1 is a schematic diagram showing a power supply for a vehicle according to a first embodiment of the present invention.
FIG. 2 is a table showing the operation of the power supply of FIG. 1 to meet various requirements of the vehicle.

Referring to FIG. 1 showing a first embodiment of the present invention, the power supply, which is designated by reference numeral 1, supplies electric power to various devices mounted on the vehicle.

The power supply 1 includes a motor generator 2 having an inverter. According to the control requirements of the vehicle, the motor generator as the generator supplies electric power through the inverter to the devices and as the load consumes electric power through the inverter.

The power supply 1 further includes a first switch 3 and a first circuit 10 connected in series and in parallel to the motor generator 2. The first circuit 10 has a lead battery 11 and an auxiliary device 12 that are connected in parallel to each other and to the motor generator 2. The auxiliary device 12 is an example of load. The first circuit 10 may have a load other than the auxiliary device 12. The lead battery 11 of the present embodiment is not an idling stop lead battery, but an ordinary battery. It is noted that this does not necessarily mean that the lead battery is excluded from an idling stop lead battery.

The power supply 1 further includes a second switch 4 and a second circuit 20 that are connected in parallel to the motor generator 2 and also connected to the first switch 3 and the first circuit 10. The second switch 4 and the second circuit 20 are connected in series. The second circuit 20 has a nickel hydride battery 21 that is connected in parallel to the lead battery 11 and to the motor generator 2. The second circuit 20 may have a load connected to the nickel hydride battery 21.

The power supply further includes a third switch 5 and a third circuit 30 (or starter circuit) that are connected in parallel to the first switch 3 and the first circuit 10. That is, the third circuit 30 is connected in parallel to the lead battery 11 and to the motor generator 2. The first switch 3 and the second switches 4, 5 are connected in parallel to each other and to the motor generator 2. The third switch 5 and the third circuit 30 are connected in series. The third circuit 30 has a capacitor 31 and a starter 32 that are connected in parallel to each other and to the motor generator 2.

The power supply 1 has at least the motor generator 2, the first switch 3, the second switch 4, the third switch 5, the lead battery 11, the nickel hydride battery 21, and the capacitor 31 and supplies electric power to loads such as the auxiliary device and the starter 32. That is, the power supply 1 has three power storage devices including the lead battery 11, the nickel hydride battery 21, and the capacitor 31 that are connected in parallel to each other.

Although not shown in the drawing, the power supply 1 has a control device for controlling operation of the power supply 1. The control device includes a computer, or a micro-processor having a calculating means, and a storage means. Controlling of devices or parts shown in FIG. 1 is performed by the control device, but the detailed description of such controlling will be omitted.

The first switch 3 can be turned on and off. When the first switch 3 is on, the first circuit 10 including the lead battery 11 is connected in parallel to the motor generator 2. When the first switch 3 is off, the first circuit 10 including the lead battery 11 is disconnected from the motor generator 2. It is noted that in the description of the embodiments, the presentation in which a circuit element being disconnected from another circuit element means that no circuit is made that allows a current to flow between the circuit elements and does not necessarily mean that the circuit elements are separated from each other.

When the first switch 3 is off, only the lead battery 11 supplies electric power to the auxiliary device 12. When the first switch 3 is on and the motor generator 2 is in regenerating operation, the motor generator 2 supplies electric power to the auxiliary device 12 instead of or together with the lead battery 11. Furthermore, when the first switch 3 is on and the second switch 4 or the third switch 5 then is on, the nickel hydride battery 21 or the capacitor 31 supplies electric power to the auxiliary device 12 instead of or together with the lead battery 11.

Similarly, the second switch 4 can be switched on or off. When the second switch 4 is on, the second circuit 20 including the nickel hydride battery 21 is connected in parallel to the motor generator 2. When the second switch 4 is off, the second circuit 20 including the nickel hydride battery 21 is disconnected from the motor generator 2.

Similarly, the third switch 5 can be turned on and off. When the third switch 5 is on, the third circuit 30 including the capacitor 31 is connected in parallel to the motor generator 2. When the third switch 5 is off, the third circuit 30 including the capacitor 31 is disconnected from the motor generator 2.

When the third switch 5 is off, only the capacitor 31 supplies electric power to the starter 32. When the third switch 5 is on and the motor generator 2 is in regenerating operation, the motor generator 2 supplies electric power to the starter 32 instead of or together with the capacitor 31. Furthermore, when the third switch 5 is on and the first switch 3 or the second switch 4 is on, the lead battery 11 or the nickel hydride battery 21 supplies electric power to the starter 32 instead of or together with the capacitor 31.

The control device of the power supply 1 stores previously data of upper limit voltages of the lead battery 11, the nickel hydride battery 21, and the capacitor 31. These upper limit voltages represent predetermined thresholds, for example, for reference data of the control. The upper limit voltage of the lead battery 11 may be the voltage at which gas begins to be generated and is, for example, 14.4 volts. The upper limit voltage of the nickel hydride battery 21 is, for example, 16 volts. The upper limit voltage of the capacitor 31 is, for example, 18 volts. The control device of the power supply 1 may control the circuits so that the voltages of the lead battery 11, the nickel hydride battery 21, and the capacitor 31 do not exceed the respective upper limit voltages. The control may be designed appropriately by those skilled in the art.

The nickel hydride battery 21 is one example of electric storage devices that can be charged at a voltage that is higher than the upper limit voltage of the lead battery 11. The electric storage devices that can be charged at a voltage higher than the upper limit voltage of the lead battery 11 may use a secondary battery other than the nickel hydride battery 21 or a capacitor 31. For example, a lithium-ion battery may be used. The capacitor 31 is one example of electric storage device that can be charged at a voltage higher than the upper limit voltages of the lead battery 11 and the nickel hydride battery 21.

The following will describe the operation of the power supply 1 according to the first embodiment of the present invention. FIG. 2 is a table showing the operation of the power supply 1 to meet various requirements of the vehicle. The requirement of a vehicle means an operation of the power supply 1 that is required by the vehicle. The power supply 1 controls the switching operation of the respective switches 3, 4, 5 in different on-off patterns when an engine (or an internal-combustion engine) is restarted after an idling stop, when the motor generator 2 performs powering operation, and when the motor generator 2 performs regenerative operation.

In restarting the engine after an idling stop, the power supply 1 makes the third switch 5 off and operates the starter 32. The third switch 5 is held (kept) off at least until the operation of the starter 32 is completed. That is, while the starter 32 is in operation, the starter 32 is disconnected from the lead battery 11 and the nickel hydride battery 21 by holding the third switch 5 in off position. As a result, only the capacitor 31 supplies electric power to the starter 32. Because the lead battery 11 and the nickel hydride battery 21 are operated independently from the starter 32, the auxiliary device 12 may be supplied with a sufficient amount of electric power.

As indicated in the table of FIG. 2, the first switch 3 and the second switch 4 may be in either of on and off positions and, therefore, the control may be designed as required.

While the motor generator 2 is performing powering operation, the power supply 1 keeps the first switch 3, the second switch 4, and the third switch 5 in off, on, and off positions, respectively. That is, only the nickel hydride battery 21 of the three electric storage devices is connected to the motor generator 2. As a result, the electric power to the motor generator 2 is supplied only from the nickel hydride battery 21. Because the lead battery 11 and the capacitor 31 are operated independently from the motor generator 2, the lead battery 11 can supply a sufficient amount of electric power to the auxiliary device 12 and the capacitor 31 can keep storage of a sufficient amount of electric power for the operation of the starter 32.

In the regenerative operation of the motor generator 2, the power supply 1 performs various controls according to the voltage of the electric storage device such as the capacitor 31. If the voltage is 14.4 volts or less in the regenerative operation of the motor generator 2, the power supply 1 keeps the first switch 3, the second switch 4, and the third switch 5 in their on positions, respectively. That is, the three electric storage devices 11, 21, 31 are all connected to the motor generator 2. It is noted that 14.4 volts is the lowest voltage of the upper limit voltages of the three electric storage devices 11, 21, 31.

If the motor generator 2 performs regenerative operation and the voltage is more than 14.4 volts and up to 16 in the regenerative operation of the motor generator 2, the power supply 1 keeps the first switch 3, the second switch 4, and the third switch 5 off, on, and on, respectively. That is, the lead battery 11 is disconnected from the motor generator 2, while the nickel hydride battery 21 and the capacitor 31 are connected to the motor generator 2. It is noted that 16 volts is a medium level voltage or the second lowest voltage of the upper limit voltages of the three electric storage devices.

In this case, the electric storage device in which its voltage has exceeded its upper limit voltage (or the lead battery 11) is prohibited from being charged. The electric storage devices in which their voltages (or the nickel hydride battery 21 and the capacitor 31) are below their upper limit voltages are charged.

If the motor generator 2 performs regenerative operation and the voltage is more than 16 volts and up to 18 volts in the regenerative operation of the motor generator 2, the power supply 1 keeps the first switch 3, the second switch 4, and the third switch 5 off, off, and on, respectively. That is, the lead battery 11 and the nickel hydride battery 21 are disconnected from the motor generator 2 and only the capacitor 31 is connected to the motor generator 2. It is noted that 18 volts is the highest voltage of the upper limit voltages of the three electric storage devices.

In this case, the electric storage devices in which their voltages have exceeded their upper limit voltage (or the lead battery 11 and the nickel hydride battery 21) are prohibited from being charged. The electric storage device in which its voltage is below its upper limit voltage (or the capacitor 31) is charged.

Thus, fine control is performed in the regenerating operation of the motor generator 2 according to the upper limit voltages of the electric storage devices. As a result, the electric storage devices can be charged appropriately to the upper limit voltages thereof without being restricted by the electric storage device (or the lead battery 11) which has a low voltage of the upper limit voltage and, therefore, the regenerative electric power can be used efficiently.

As is apparent from the above description, the power supply 1 according to the first embodiment of the present invention performs various operations appropriately according to characteristics of the respective electric storage devices, so that the electric storage devices operate maximally. For example, each electric storage device is controlled according to its chargeable voltage, so that the electric storage devices can perform the regenerative operation in a wider range of voltage and fuel efficiency is improved by efficiently utilizing the regenerative electric power. Furthermore, an ordinary lead battery can be used instead of a costly idling stop lead battery. Therefore, the manufacturing cost of the power supply 1 can be suppressed.

Though the power supply 1 according to the first embodiment has three switches, the power supply 1 may dispense with one of these switches as a variation of the first embodiment. That is, the power supply 1 may have at least two switches of the first switch 3, the second switch 4 and the third switch 5.

For example, in the case that the first switch 3 is removed from the power supply 1, the lead battery 11 discharges during restarting of the engine and the powering operation of the motor generator 2. However, the regenerative electric power controlled according to the upper limit voltages of the three electric storage devices can be utilized effectively as in the first embodiment of FIG. 1.

In the case that the second switch 4 is removed from the power supply 1, it may be so configured that not regenerative operation is performed when the voltage exceeds 16 volts. In this case, the same regenerative electric power effect can be accomplished by the motor generator 2 as in the first embodiment of FIG. 1. Furthermore, the regenerative electric power can be performed in a part of the range of voltage in which the voltage of the motor generator 2 exceeds the upper limit voltage of the lead battery 11. Therefore, the regenerative electric power according to the upper limit voltages of the three electric storage devices can be performed at least partly.

Furthermore, when the third switch 5 is removed from the power supply 1, the capacitor 31 discharges during the powering operation of the motor generator 2, but the regenerative electric power according to the upper limit voltages of the three electric storage devices can be performed as in the first embodiment of FIG. 1. In restarting an engine, the regenerative operation can be performed efficiently as in the first embodiment of FIG. 1 by keeping the first switch 3 and the second switch 4 in their off positions, respectively.

Thus removing any one of the three switches can reduce the manufacturing cost of the power supply 1.

Second Embodiment

In the first embodiment, each of the switches is turned on and off to connect or disconnect its associated electric storage device to and from the motor generator 2. In the second embodiment, the third switch 5 in the first embodiment is removed and one switch controls the connection and disconnection of the two electric storage devices including the capacitor 31 to and from the motor generator 2. The following will describe the difference between the first and second embodiments.

Figures 3, 4:
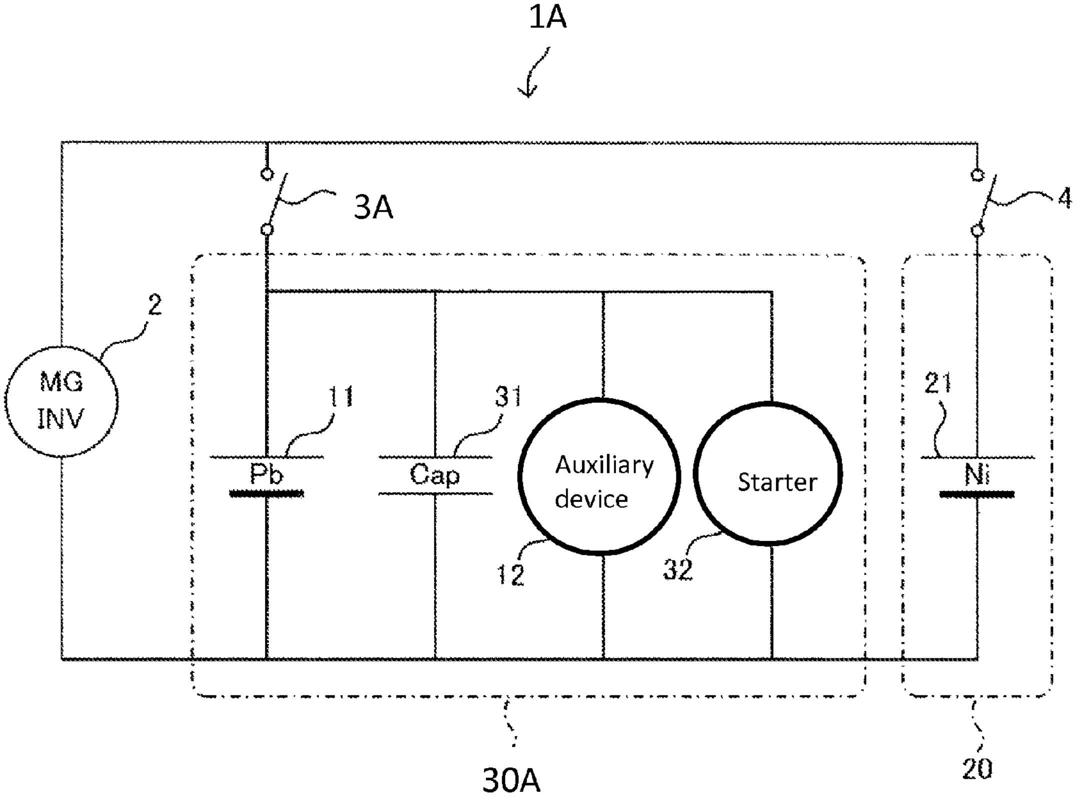
FIG. 3 is a schematic diagram showing a power supply for a vehicle according to a second embodiment of the present invention.
FIG. 4 is a table showing the operation of the power supply of FIG. 3 to meet various requirements of the vehicle.

FIG. 3 is a schematic diagram showing a power supply 1A according to the second embodiment. As shown in FIG. 3, the third switch 5 of the first embodiment is removed and a third circuit 30A (or the starter circuit) including the third circuit 30 and the first circuit 10 of the first embodiment is connected to the first switch 3A. That is, the lead battery 11, the auxiliary device 12, the capacitor 31, and the starter 32 are connected in series to the first switch 3A, respectively, and the first switch 3A controls the switching of the capacitor 31. FIG. 4 is a table illustrating the operation of the power supply 1A to meet various requirements of the vehicle. Control items shown in FIG. 4 may be changed as required.

Figures 5, 6:
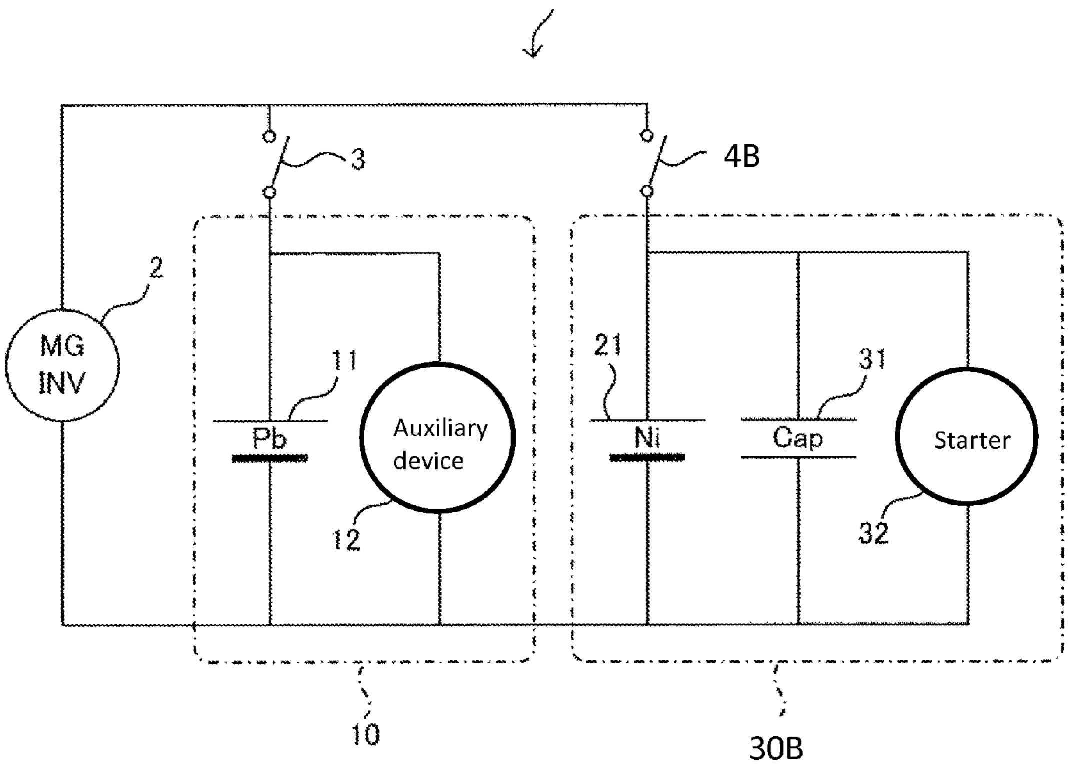
FIG. 5 is a schematic diagram showing a power supply for a vehicle according to another example of the second embodiment of the present invention.
FIG. 6 is a table showing the operation of the power supply of FIG. 5 to meet various requirements of the vehicle.

In the second embodiment, it may be so configured that the second switch 4 controls the connection of the capacitor 31 to the motor generator 2. FIG. 5 is a schematic diagram showing a power supply 1B according to another example of the second embodiment. As shown in FIG. 5, the power supply 1B dispenses with the third switch 5 of the first embodiment (FIG. 1) and the third circuit 30B (or the starter circuit) including the second circuit 20 and the third circuit 30 of the first embodiment is connected to the second switch 4B. That is, the nickel hydride battery 21, the capacitor 31, and the starter 32 are connected in series to the second switch 4B, respectively. The second switch 4B controls the connection of the capacitor 31 to the motor generator 2. FIG. 6 is a table illustrating the operation of the power supply 1B to meet various requirements of the vehicle. The control items shown in FIG. 6 may be changed as required.

The power supplies 1A and 1B according to the second embodiment of the present invention perform appropriate switching operation according to the characteristics of the respective electric storage devices, so that the electric storage devices perform their functions maximally. For example, fuel efficiency is improved by effectively utilizing the regenerative electric power and the ordinary lead battery 11 can be used instead of a costly idling stop lead battery. In the latter case, the cost of the power supplies 1A and 1B can be suppressed.

Third Embodiment

Figures 7, 8:
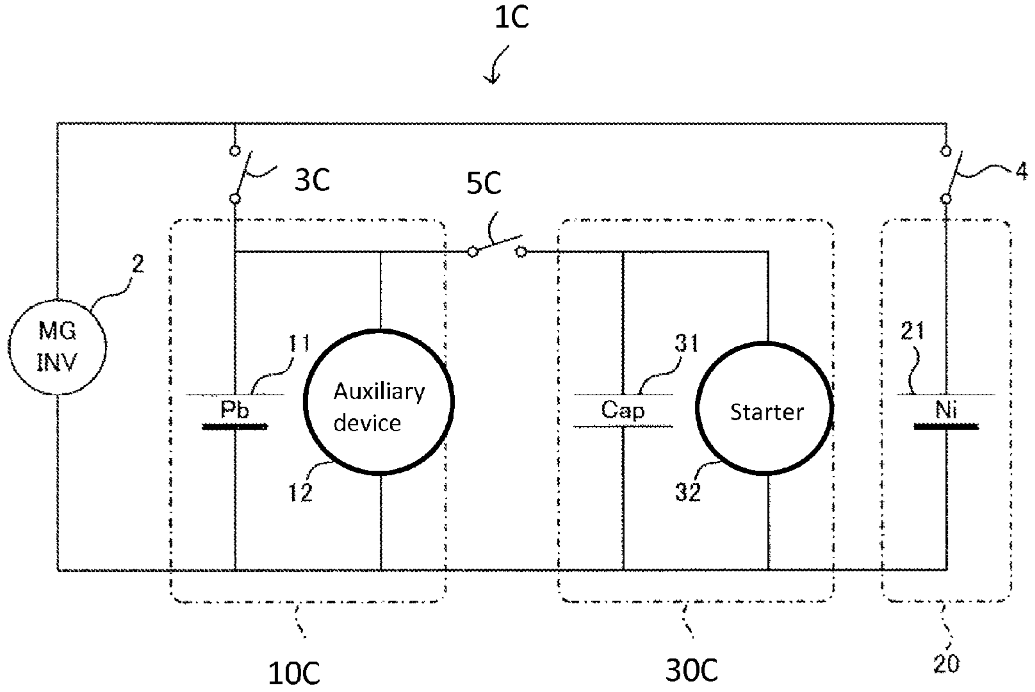
FIG. 7 is a schematic diagram showing a power supply for a vehicle according to a third embodiment of the present invention.
FIG. 8 is a table showing the operation of the power supply of FIG. 7 to meet various requirements of the vehicle.

In the third embodiment, unlike the first embodiment, the first switch 3 and the third switch 5 are connected in series. The following will describe the third embodiment. The third embodiment differs from the first embodiment in that the first switch 3 and the third switch 5 of the first embodiment are connected in series. Referring to FIG. 7, the first switch 3C and the third switch 5C are connected in parallel to the second switch 4 and to the motor generator 2. The third switch 5C and the third circuit 30C (or the starter circuit) are connected in series to the first switch 3C. Furthermore, the third switch 5C and the third circuit 30C are connected in parallel to the first circuit 10C (mainly to the lead battery 11) and to the motor generator 2.

The control items shown in FIG. 8 may be changed as required.

In restarting the engine after an idling stop, the power supply 1C turns off the third switch 5C to operate the starter 32 and holds the third switch 5C off at least until the operation of the starter 32 is completed. That is, holding the third switch 5C off while the starter 32 is being operated, the lead battery 11 and the nickel hydride battery 21 are disconnected from the starter 32. As a result, only the capacitor 31 supplies electric power to the starter 32, and the lead battery 11 and the nickel hydride battery 21 are operated independently from the starter 32. Thus, a sufficient amount of electric power can be supplied to the auxiliary device 12.

It is noted that the first switch 3C and the second switch 4 may be controlled according to any requirements and the control may be changed as required.

During the powering operation of the motor generator 2, the power supply 1C turns on the second switch 4 and turns off the first switch 3C and the third switch 5C, respectively. That is, only the nickel hydride battery 21 of the three electric storage devices is connected to the motor generator 2 and the capacitor 31 is disconnected from the auxiliary device 12. As a result, the supply of electric power to the motor generator 2 is made only from the nickel hydride battery 21 and the lead battery 11 and the capacitor 31 are operated independently from the motor generator 2. Therefore, the lead battery 11 supplies a sufficient amount of electric power to the auxiliary device 12 and the capacitor 31 stores a sufficient electric power for the operation of the starter 32.

It is noted that when the discharging of the lead battery 11 is allowed for the powering operation, the first switch 3C may be controlled to be turned on.

During the regenerative operation of the motor generator 2, the power supply 1C performs various controls according to the voltage of the electric storage device such as the capacitor 31. When the voltage is below 14.4 volts, the power supply 1C turns on the first switch 3, the second switch 4, and the third switch 5. That is, the three electric storage devices are all connected to the motor generator 2.

When the voltage is greater than 14.4 volts but not greater than 16 volts, the power supply 1C turns off the first switch 3C and turns on the second switch 4. The third switch 5C may be then in ether of on and off positions and those skilled in the art can design the control appropriately. That is, the lead battery 11 and the capacitor 31 are disconnected from the motor generator 2 and the nickel hydride battery 21 is connected to the motor generator 2.

The power supply 1C according to the third embodiment of the present invention performs appropriate switching operation according to the characteristics of the respective electric storage devices, so that the electric storage devices perform their functions maximally. For example, fuel efficiency is improved by effectively utilizing the respective the regenerative electric power and the ordinary lead battery 11 can be used instead of a costly idling stop lead battery. In the latter case, the whole cost of the power supply 1C can be suppressed.

What is claimed is:

1. A power supply for a vehicle, comprising:

a generator;

a first circuit including a lead battery and an auxiliary device that are connected in parallel to each other;

a second circuit including an electric storage device;

a third circuit including a capacitor and a starter that are connected in parallel to each other;

a first switch that is connected to the first circuit in series between the generator and the first circuit, and disconnects the first circuit from the generator when the first switch is open;

a second switch that is connected to the second circuit in series between the generator and the second circuit, and disconnects the second circuit from the generator when the second switch is open; and a third switch that is connected to the third circuit in series between the generator and the third circuit, and disconnects the third circuit from the generator when the third switch is open, wherein the first circuit, the second circuit, and the third circuit are connected in parallel to each other and connected to the generator respectively through the first switch, the second switch, and the third switch.

2. The power supply for a vehicle according to claim 1, wherein the power supply includes the first, second, and third switches, wherein while the starter is in operation, the third switch is held in an open position to disconnect the lead battery and the electric storage device from the starter, and wherein the capacitor supplies electric power to the starter to be operated.

3. A power supply for a vehicle, comprising:

a generator;

a first circuit including a lead battery and an auxiliary device that are connected in parallel to each other;

a second circuit including an electric storage device;

a third circuit including a capacitor and a starter that are connected in parallel to each other;

a first switch that is connected to the first circuit in series between the generator and the first circuit, and disconnects the first circuit from the generator when the first switch is open; and a second switch that is connected to the second circuit in series between the generator and the second circuit, and disconnects the second circuit from the generator when the second switch is open, wherein the first circuit and the second circuit are connected in parallel to each other and connected to the generator respectively through the first switch and the second switch, and wherein the third circuit is included in the first circuit or the second circuit that is connected to the third circuit in parallel.

4. A power supply for a vehicle, comprising:

a generator;

a first circuit including a lead battery and an auxiliary device that are connected in parallel to each other;

a second circuit including an electric storage device;

a third circuit including a capacitor and a starter that are connected in parallel to each other;

a first switch that is connected to the first circuit in series between the generator and the first circuit, and disconnects the first circuit from the generator when the first switch is open;

a second switch that is connected to the second circuit in series between the generator and the second circuit, and disconnects the second circuit from the generator when the second switch is open; and a third switch connected to the third circuit in series, wherein the third switch and the third circuit are connected in parallel to the first circuit, wherein when the third switch is open, the third circuit is disconnected from the first circuit, and wherein the first circuit and the second circuit are connected in parallel to each other and connected to the generator respectively through the first switch and the second switch.

5. The power supply for a vehicle according to claim 4, wherein while the starter is being operated and the third switch is held open, the third circuit is disconnected from the first circuit and the generator so that the capacitor supplies electric power to the starter to be operated.

* * * * *